US009872148B2

(12) United States Patent
King et al.

(10) Patent No.: US 9,872,148 B2
(45) Date of Patent: Jan. 16, 2018

(54) ADAPTIVE MOBILE WIRELESS CALL RESCUE

(71) Applicant: Voalte, Inc., Sarasota, FL (US)

(72) Inventors: Benjamin King, Gainesville, FL (US); Donald Taylor Anderson, Sarasota, FL (US)

(73) Assignee: Voalte, Inc., Sarasota, FL (US)

( * ) Notice: Subject to any disclaimer, the term of this patent is extended or adjusted under 35 U.S.C. 154(b) by 26 days.

(21) Appl. No.: 14/736,245

(22) Filed: Jun. 10, 2015

(65) Prior Publication Data

US 2016/0366559 A1 Dec. 15, 2016

(51) Int. Cl.
*H04W 4/02* (2009.01)
*H04W 24/08* (2009.01)
*H04W 4/16* (2009.01)

(52) U.S. Cl.
CPC .......... *H04W 4/028* (2013.01); *H04W 4/16* (2013.01); *H04W 24/08* (2013.01)

(58) Field of Classification Search
CPC ........ H04W 4/028; H04W 4/16; H04W 24/08
USPC ...................................... 455/456.1
See application file for complete search history.

(56) References Cited

U.S. PATENT DOCUMENTS

| 9,338,747 B1* | 5/2016 | Parthasarathy ... H04W 52/0245 |
| 2005/0202849 A1* | 9/2005 | Ignatin ................. H04M 3/424 455/564 |
| 2007/0274488 A1* | 11/2007 | Callaghan ......... H04M 1/72519 379/201.01 |
| 2009/0203375 A1* | 8/2009 | Gisby .................... H04W 8/30 455/426.1 |

* cited by examiner

*Primary Examiner* — Erica Navar
(74) *Attorney, Agent, or Firm* — Long Technology Law, LLC; Joseph L. Long

(57) ABSTRACT

Systems and methods can support establishing a voice call over a wireless computer network between a mobile computing device and a second device, where the second device may be either another mobile device or a gateway for communicating to a traditional landline or mobile telephone. The connectivity status of the mobile computing device may be monitored. Call disruption indicators may be provided to the users in response to connectivity loss between the mobile computing device and the wireless computer network. Geographical location information associated with the mobile computing device may be collected in response to connectivity loss and a connectivity loss model may be generated. A connectivity-loss warning indicator may be provided to the users based upon a proximity metric of the geographical location associated with the mobile computing device and the connectivity loss model.

20 Claims, 5 Drawing Sheets

ADAPTIVE MOBILE WIRELESS CALL RESCUE

BACKGROUND

Voice calls may be established between two or more users over data networks such as local area networks, enterprise networks, or the Internet. Certain examples of such voice calls are generally referred to as voice-over-internet-protocol (VoIP) calls. The communication devices associated with these calls are generally connected to the data network as a general computing machine as opposed to connecting to a mobile telephone carrier as a cellular or mobile telephone. These networks generally comprise one or more wireless network links, such as those associated with Wi-Fi or similar wireless local area networks. Wireless mobile communication devices in this context generally establish a wireless network link to the nearest wireless access point.

Poor coverage, weak signal strength, interference, noise, and/or distortion can negatively affect wireless data network links. As a result, voice connections between users may be delayed by a dead period without sound or may be involuntarily terminated resulting in dropped calls. Users may continue to speak or listen during a dead period or after a call has been dropped because they are not aware of the lost connection. Users may not be notified that a call has been, or is about to be dropped, which can result in lost information, user annoyance, and a generally less than desirable user experience.

There is a need in the art for detecting connection disruptions on wireless links of data networks servicing voice communication and then alerting the users on each end that their call is being temporarily disrupted. There is a further need that the alerts support indicating link disruptions to users on either end of a voice connection even when one user is not using a wireless data network. For example, the user may instead be using a traditional landline telephone or a traditional cellular/mobile telephone connected via a mobile carrier.

SUMMARY

In certain example embodiments described herein, methods and systems can support establishing a voice call over a wireless computer network between a mobile computing device and a second device, where the second device may be either another mobile device or a gateway for communicating to a traditional landline or mobile telephone. The connectivity status of the mobile computing device to the wireless computer network may be monitored. A call disruption indicator may be provided to a first user associated with the mobile computing device in response to connectivity loss between the mobile computing device and the wireless computer network. A call disruption indicator may also be provided to a second user associated with the second device. Geographical location information associated with the mobile computing device may be collected in response to connectivity loss between the mobile computing device and the wireless computer network. A connectivity loss model may be generated based upon the determined geographical location information. A connectivity-loss warning indicator may be provided to the users based upon a proximity metric of the geographical location associated with the mobile computing device and the connectivity loss model.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The call rescue technology presented herein can enable techniques for wireless call interruption mitigation. Such techniques can efficiently alert mobile users when connectivity is lost, or is about to be lost, in a wireless data network supporting voice connectivity. The call rescue technology may operate in conjunction with a mobile device. The call rescue technology may also operate in association with a voice server. These mobile devices and voice servers may operate in conjunction with a data communications network comprising one or more wireless network links. Voice calls may be established as voice-over-internet-protocol (VoIP) calls of according to some other digital streaming format. The voice server may also serve as a voice gateway connected to a private branch exchange (PBX) system, which may be connected to one or more traditional telephones via standard plain old telephone service (POTS) or traditional mobile/cellular networks. Users with traditional telephones may thus be notified when a mobile user on the wireless data communications network with whom they are communicating has lost or is about to lose network connectivity. The call rescue technology may monitor the transmission of communication data packets in order to identify or predict when a mobile user loses, or is about to lose, network connectivity. Heartbeat signals, or other such keep-alive packets, may be monitored to identify or predict when a mobile user loses, or is about to lose, network connectivity. The location and motion of mobile users may be tracked to model and predict geographical areas, or locations, where connection losses are most likely to occur.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
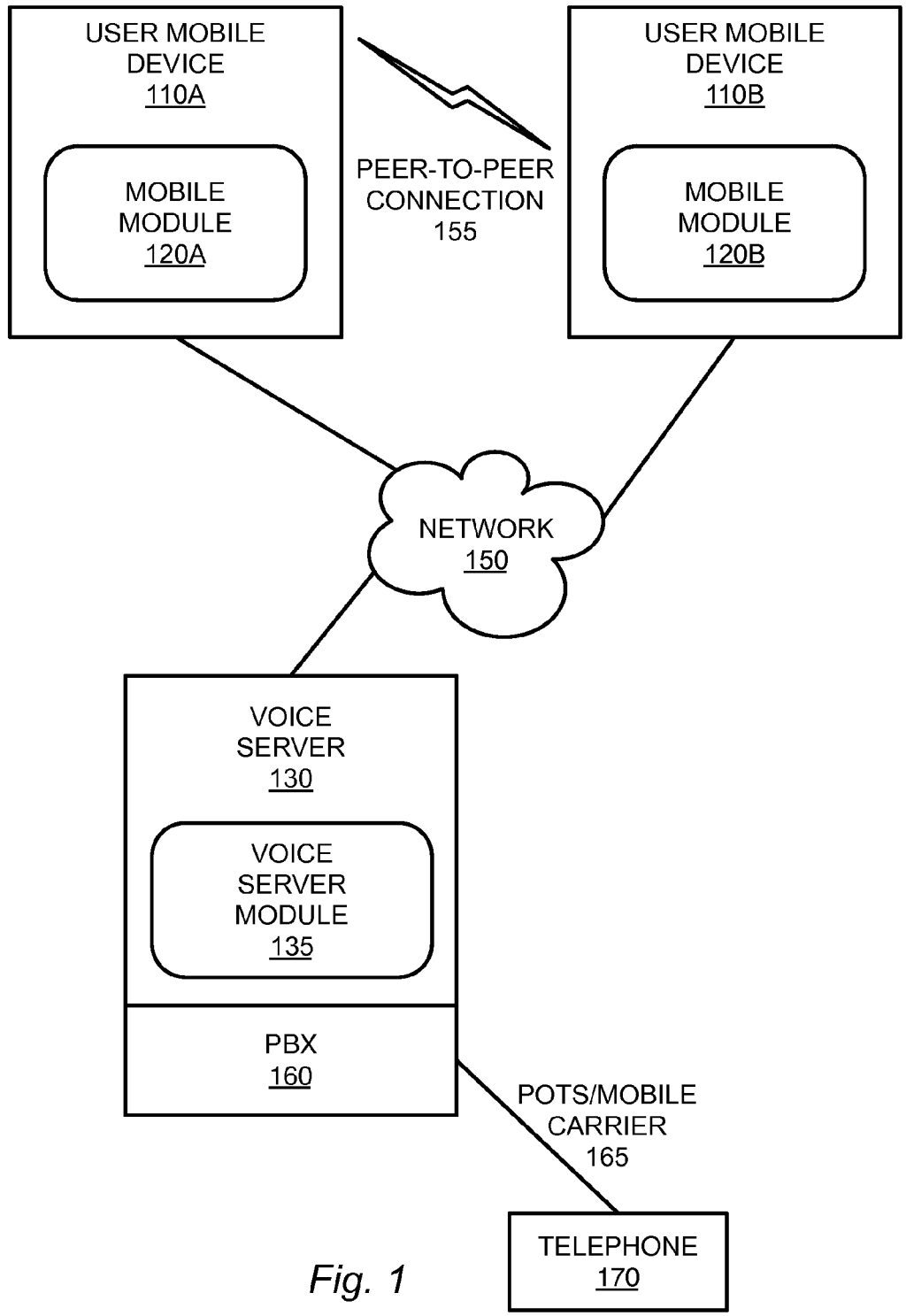
FIG. 1 is a block diagram illustrating mobile devices and a voice server connected to a wireless communications network in accordance with one or more embodiments presented herein.

FIG. 1 is a block diagram illustrating a first user mobile device 110A, a second user mobile device 110B, and voice server 130 connected to a wireless communications network 150 in accordance with one or more embodiments presented herein. Mobile modules 120A and 120B may execute in association with the user mobile devices 110A and 110B, respectively. A voice server module 135 may execute in association with the voice server 130. The voice server 130 may be in communication with a PBX system 160, which, in turn, may be in communication with a standard telephone 170. The PBX 160 and the standard telephone 170 may communicate via a traditional wired or wireless carrier link 165. The user mobile device 120A and the user mobile device 120B may also be in wireless communication with one another via a peer-to-peer wireless connection 155.

The user mobile device 110A and the user mobile device 110B may be referred to collectively, or in general, as user mobile devices 110. The user mobile devices 110 may be any mobile communication or computing device such as a mobile handset, smart phone, tablet, laptop computer, or any other computing machine. The mobile devices 110 may include microphones, speakers, headsets, or other audio input/output components to support voice calls. The user mobile devices 110 may include one or more data network interface to support communications over a wireless network such as network 150. The user mobile devices 110 may include user interfaces for setting up, placing, answering, or terminating voice calls over a wireless data network such as network 150.

The mobile module 120A and the mobile module 120B may be referred to collectively, or in general, as mobile modules 120. The mobile modules 120 may operate on, or in conjunction with, the respective user mobile devices 110. The mobile modules 120 may be one or more software components, firmware components, hardware circuits, or any combination thereof.

The mobile module 120 may support various functions and operations associated with the user mobile device 110. These functions and operations may include those associated with wireless call rescue technology as presented herein. For example, the mobile module 120 may support detection of wireless communications network disruptions. The mobile module 120 may support playing hold music or some other audio signal to alert users that wireless connectivity has been lost or is about to be lost.

The mobile module 120 may detect, track, and report a location and/or a direction of motion for the associated user mobile device 110. The report of this information may be made to the voice server module 135 associated with the voice server 130 or other server or system associated with the call rescue technology presented herein. The information may be used to maintain a history of lost connection locations and generate a model associated with connection losses, which may be visualized as a wireless network service coverage map.

The voice server 130 may be a computing machine configured to operate in conjunction with the voice server module 135 to support voice communications between user devices such as the user mobile devices 110. For example, the voice server 130 may support establishing, managing, and terminating voice connections between the user mobile devices 110. The voice server 130 may include input/output functionally configured to communicate with the PBX 160. Communication between the PBX 160 and the voice server 130 may include sending and receiving voice communication signals.

The network 150 may be a data communications network capable of supporting data communications among network-connected devices. The network 150 may include wireless capabilities such those associated with one or more wireless local area networks. According to certain embodiments, these wireless area networks may be Wi-Fi networks. The network 150 may also support wired network connections such as Ethernet or fiber optics. The network 150 may interface to the voice server 130 to support connected systems to receive and send voice communications in association with the voice server 130 and the PBX 160.

The wireless peer-to-peer connection 155 may operate within, or in conjunction with, the network 150. The peer-to-peer connection 155 can support direct communications between, for example, the first user mobile devices 110A and the second user mobile device 110B. The network 150 may be configured to receive and send voice communication packets between the user mobile devices 110 in support of communications over the wireless peer-to-peer connection 155.

The PBX 160 may be telephone private branch exchange system for use in various enterprise environments for telephony service. The PBX 160 may interface between telephone systems within the enterprise and outside telephone carriers. According to certain embodiments, the PBX 160 may interface to a traditional wired carried link via the POTS/mobile carrier 165. In such an embodiment, the POTS/mobile carrier 165 will generally be one or more wired POTS lines or carrier bundles such as ISDN. Also, an outside user may be using a traditional wired telephone as the telephone 170 to establish voice communications with a user mobile device 110 operating on the network 150.

Alternatively, the POTS/mobile carrier 165 may be a traditional wireless carrier link. In such embodiments, the telephone 170 may be a traditional mobile or cell phone in voice communication with a user mobile device 110 on network 150. In either embodiment, call rescue functionality can support alerting the user of the telephone 170 when the user mobile device 110 encounters a wireless network connection disruption.

According to certain embodiments, the telephone 170 may be a standard wired telephone device. The telephone 170 may be a traditional wired telephone when connected to a wired carrier link via a POTS carrier as the POTS/mobile carrier 160. It should be appreciated that even in such embodiments, the telephone 170 may be a cordless telephone that can operate wirelessly within the range of its associated private base station. Such a POTS cordless phone should not be confused with a mobile or cellular wireless telephone. POTS phones generally operate with voice-grade, wired telephone service based on signal transmission over various public carrier telephone networks. These networks generally operate over unshielded twisted pair wiring, at least near their customer terminations, which may be referred to as the "home run," "access," or "last mile" portions of the network.

According to various other embodiments, the telephone 170 may be a traditional mobile or cellular telephone when connected via a mobile carrier link as the POTS/mobile carrier 160. A mobile phone (also known as a cellular phone or cell phone) may be any telephone 170 operable to make and receive telephone calls over a radio link while moving around a wide geographic area. This is generally accomplished by connecting to a cellular mobile network provided by a mobile telephone carrier.

It should be appreciated that where voice communications are referenced throughout this disclosure as a non-limiting example, various other communication modalities may be substituting without departing from the spirit or scope of the technology presented herein. For example, the communications may be video conferencing, telepresence, video monitoring, haptic, motor-control, chemical/smell, or any other such media or sensory signal streaming between user mobile devices 110 and or/telephones 170. In such instances, the telephones 170 may be other communication devices and the user mobile devices 110 may include additional interfaces such as cameras or video displays.

Figure 5:
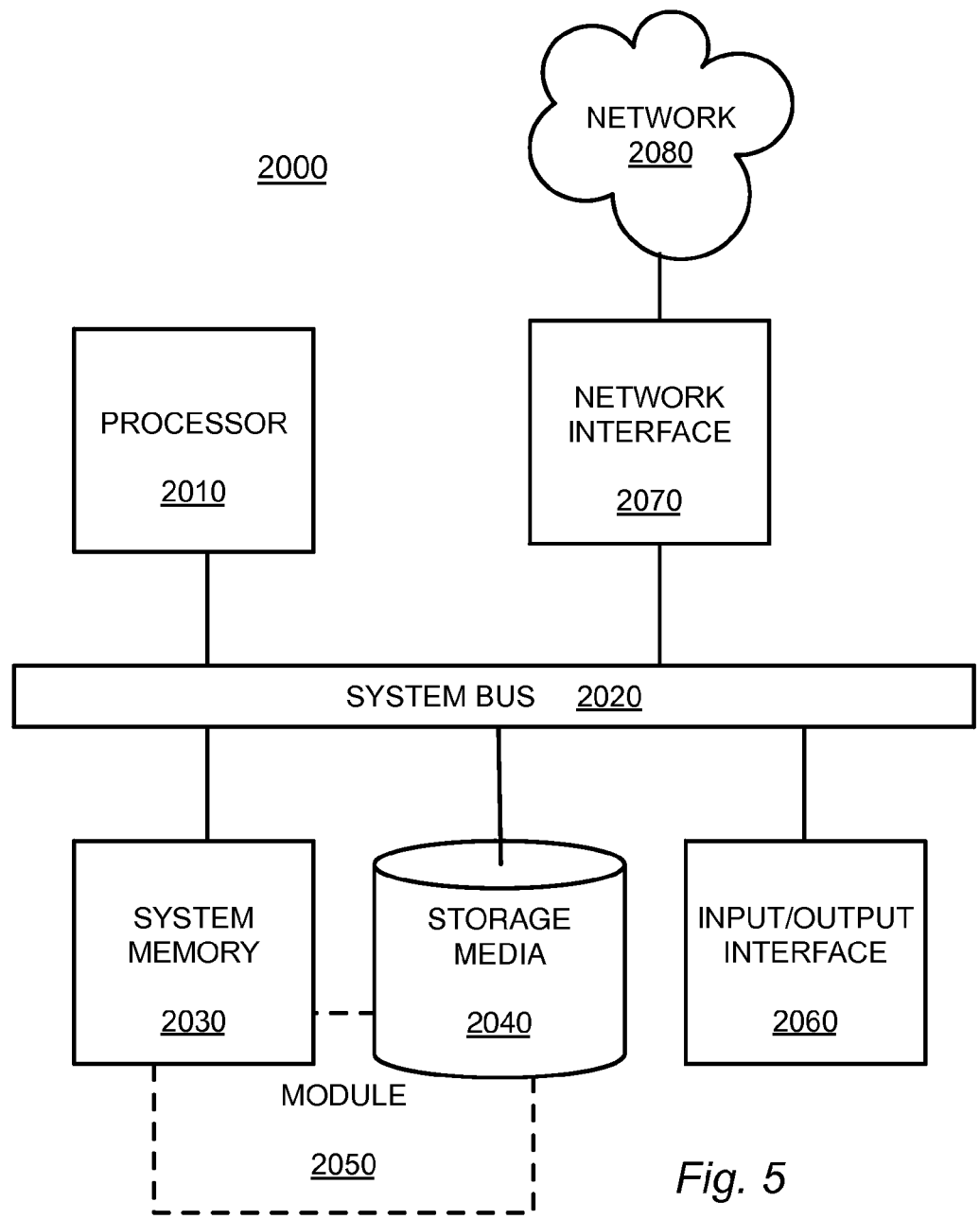
FIG. 5 is a block diagram depicting a computing machine and a module in accordance with one or more embodiments presented herein.

The user devices 110, voice server 130, PBX 160, or any other systems associated with the technology presented herein may be any type of computing machine such as, but not limited to, those discussed in more detail with respect to FIG. 5. Furthermore, any modules (such as the mobile modules 120 or voice server module 135) associated with any of these computing machines or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks such as the network 150 or the wireless peer-to-peer connection 155. The network 150 (including the wireless peer-to-peer connection 155) may include any type of data or communications network including any of the network technology discussed with respect to FIG. 5.

Figure 2:
FIG. 2 is a block diagram depicting mobile devices communicating over a network with a peer-to-peer wireless connection in accordance with one or more embodiments presented herein.

FIG. 2 is a block diagram depicting mobile devices 110A and 110B communicating via the wireless peer-to-peer wireless connection 155 in accordance with one or more embodiments presented herein. The mobile devices 110A and 110B may operate in conjunction with the respective call rescue modules 210A and 210B.

The call rescue modules 210A and 210B may be referred to collectively, or in general, as call rescue modules 210. According to certain embodiments, the call rescue modules 210 may be part of the mobile modules 120. The call rescue modules 210 may carry out the technology presented herein. For example, the call rescue modules 210 can monitor network connectivity and issue alerts to user mobile devices 110 when connectivity is lost or is about to be lost due to one or more of the user mobile devices 110 encountering a network disruption.

Certain advantages to having functionality associated with the call rescue modules 210 executed in associated with the user mobile devices 110 may include call rescue operations even during peer-to-peer calls. In a purely peer-to-peer call, the user mobile devices 110 can communicate over the peer-to-peer wireless connection 150 without constant interaction with, or monitoring by, an intermediary system such as the voice server 130. Certain other advantages to the call rescue functionality being located with the user mobile device 110 may include operation of call rescue without having to modify existing installation of the voice server 130 or the PBX 160.

Figure 3:
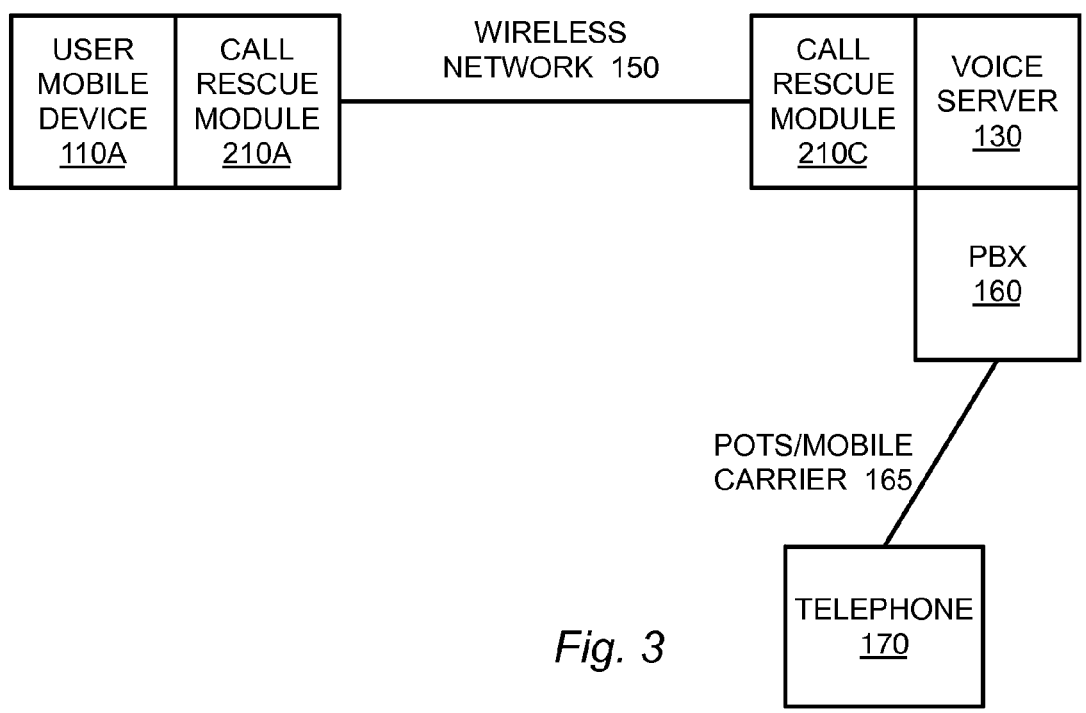
FIG. 3 is a block diagram depicting a mobile device communicating over a wireless network with a voice server in accordance with one or more embodiments presented herein.

FIG. 3 is a block diagram depicting a user mobile device 110A communicating with a voice server 130 via a wireless network 150 in accordance with one or more embodiments presented herein. The call rescue module 210A may execute in association with the user mobile device 110A. The call rescue module 210C may execute in association with the voice server 130. The voice server 130 may interface with PBX 160 to allow voice communication between user mobile device 110A and a telephone 170 via a POTS/mobile carrier 165.

The call rescue module 210C may be associated with the voice server module 135 or any other module associated with the voice server 130 or the PBX 160. A user on a traditional landline telephone 170 or a traditional mobile carrier telephone 170 may communicate with a user mobile device 110 on the wireless network 150. The user of the telephone 170 may not be aware of a connectivity disruption within the wireless network 150 until noticing a dead period without sound or response from the user mobile device 110. To mitigate this condition, the call rescue module 210C can provide alerts to the telephone 170 of connectivity loss, or impending connectivity loss, associated with the user mobile device 110 and/or the wireless network 150.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 4:
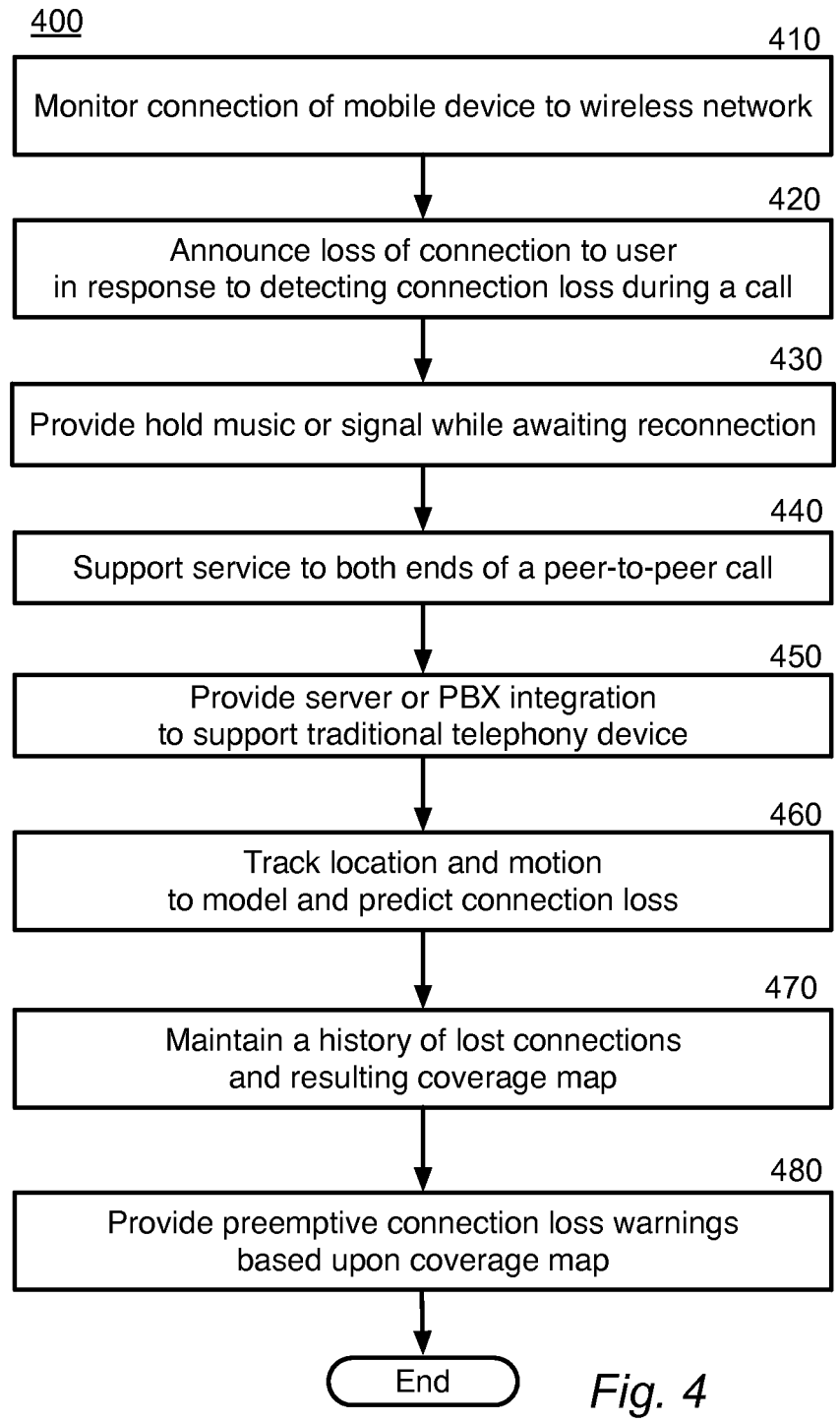
FIG. 4 is a block flow diagram illustrating a method for managing a user experience associated with connection disruptions in wireless data networks supporting voice calls in accordance with one or more embodiments presented herein.

FIG. 4 is block flow diagram illustrating a method 400 for managing a user experience associated with connection disruptions in wireless data networks supporting voice calls in accordance with one or more embodiments presented herein. According to certain embodiments, the call rescue module 210 may inform users of disruptions in a wireless link associated with their voice connection. According to certain embodiments, the call rescue module 210 may alert mobile users in a wireless communications network that their user mobile device 110 appears to be moving into an area having a history of connectivity disruptions. It should be appreciated that method 400 may be carried out by call rescue module 210 associated with the user mobile devices 110, the call rescue module 210C associated with voice server 130, or a combination thereof.

In block 410, the user mobile devices 110 and/or the voice server 130 can monitor the wireless connections of the mobile devices 110 on the network 150. These wireless connections may include the peer-to-peer wireless connection 155. The mobile devices 110 and/or the voice server 130 may utilize various transmission errors in communication packets to detect when connectivity is disrupted, a connection is lost, a call is dropped, or a call is about to be dropped. The mobile devices 110 and/or the voice server 130 may utilize heartbeat signals, keep alive timers, acknowledgement timeouts, watchdog timers, message protocol disruptions, signaling disruptions, failed acknowledgements, failed packet ordering, or other such indicators to detect the various types of connectivity disruptions that may interfere with voice calls.

Voice communication over a data communications network may be accomplished by digitizing and compressing the analog voice signals, sending the resulting bits steams as data packets, and decoding and converting the digital data back to analog signals at the receiving end.

Streaming voice communications between two or more user mobile devices 110 may be supported in accordance with communications protocols, which may be packet-oriented, fire-and-forget, or otherwise not connection-oriented. Some protocols may not support mechanisms for rapidly informing a higher layer service that network communication has been disrupted. Lack of such support can be mitigated using the heartbeat mechanisms, keep-alive timers, signaling, message protocol support, and other mechanisms presented herein.

Simple but less robust protocols, such as the User Datagram Protocol (UDP), may be used to stream voice data as a series of small packets. There may be no mechanism within such protocols to guarantee successful delivery of packets. If data is lost, the voice stream may suffer a dropout. Voice streaming may use UDP because dropping packets is preferable to waiting for packets to be resent or delayed by other error correction approaches.

In block 420, the call rescue module 210 can announce loss of connectivity to the user mobile devices 110 in response to detecting connection loss during a call. This announcement may alert mobile users in peer-to-peer connection 155 that a mobile device 110 has lost, or is about to lose, network connectivity. The call rescue module 210C can announce loss of connection of mobile device 110 to telephone 170 in response to detecting connection loss during a call. This announcement may alert a user on traditional landline or traditional mobile carrier telephone 170 that the user with mobile device 110 on network 150 has lost, or is about to lose, network connectivity. When connectivity is lost, the call rescue modules 210 may alert callers at both ends of a voice communication link that a mobile device 110 has lost connection. The alert may be a message that one or both callers have temporarily disconnected and reconnection is underway.

In block 430, the call rescue module 210 can provide hold music or some other audio signal to the user mobile devices 110 while waiting for reconnection. This music or audio signal can indicate to mobile users that there is a connectivity disruption somewhere in the call. According to certain embodiments, the call rescue module 210C can provide hold music or some other audio signal to telephone 170 while waiting for reconnection. The music or audio signal can indicate to a user on traditional landline or traditional mobile carrier telephone 170 that the user mobile device 110 at the other end of the call may be suffering a network connectivity disruption. It should be appreciated that the hold music or other audio signal may also, or alternatively, be a visual display on a user interface such as graphical or textual indicators. Similarly, haptic indicators or other such alerting mechanisms may be used without departing from the spirit or scope of the technology presented herein.

In block 440, the call rescue module 210 can support communication service to user mobile devices 110 while waiting for reconnection via the peer-to-peer wireless connection 155. This support may include monitoring radio signals from the network 150 to determine when signal strength and quality are sufficient to permit reconnection via peer-to-peer wireless connection 155. This support may also include storing the identification of the other user in a disrupted call and, when signal strength and quality are sufficient, prompting (or automatically initiating) the user mobile device 110 to attempt reconnection via the peer-to-peer wireless connection 155.

In block 450, the call rescue module 210C can support integration with the voice server 130 and/or the PBX 160 to support communication with traditional POTS landline or mobile/cellular telephones 170. The call rescue module 210C can provide alerts to the telephone 170 of connectivity loss, or impending connectivity loss, associated with the user mobile device 110 and/or the wireless network 150. Commands and/or signals may be issued to prevent PBX 160 from disconnecting the call while waiting for reconnection of the user mobile device 110 to the local wireless network 150. Commands and/or signals may be issued to prevent the POTS/mobile carrier 165 from disconnecting the call while waiting for reconnection of the user mobile device 110 to the local wireless network 150. Commands and/or signals may be issued to prevent the wireless network 150 from disconnecting the call while waiting for reconnection of the user mobile device 110 to the local wireless network 150.

In block 460, location and motion information associated with the mobile devices 110 may be tracked. The position of a user mobile device 110 may be established using GPS, wireless beacons, network access proximity information, video/image locating, and so forth. Motion information may be derived from changes in location information over time. Motion information may also be obtained from motion detectors, accelerometers, or other such sensors. The location and motion information may be reported from the user mobile devices 110 (or other sources) to the call rescue system by transmission to the voice server module 135, the call rescue modules 210, or other modules associated with call rescue.

In block 470, one or more of the modules associated with the call rescue functionality can record and store the location and motion information of the user mobile devices 110 upon loss of network connectivity. This historical data may be used to generate a spatial model of call disruption statistics or a connectivity-loss model. From these models, a coverage map may be formed to establish the likelihood of a connected user mobile device 110 suffering a connectivity disruption given its location and motion information.

In block 480, the call rescue modules 210 can provide preemptive connection loss warnings to operators of the user mobile devices 110. Based on the models discussed with respect to block 470, the call rescue modules 210 may issue an alert when a user mobile device 110 is moving into an area having a history of connectivity disruptions. For example, locations near an elevator entrance and/or inside an elevator may be historically associated with disruptions in network connectivity. The current location information along with a history of lost connections may be leveraged to warn that a user mobile device 110 may be entering an area where it is likely to lose its connection to the local wireless network 150 thereby giving the operator the option to stop moving into that area. A proximity metric may be established as a distance between the connectivity-loss model and the user mobile device 110. The proximity metric along with a proximity threshold that when exceeded can trigger a connectivity-loss warning indicator to either or both users.

Example Systems

FIG. 5 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for wireless call interruption mitigation, comprising:
    establishing a wireless connection between a mobile computing device and a wireless computer network;
    establishing a voice call over the wireless computer network between the mobile computing device and a second computing device;
    monitoring a connectivity status of the mobile computing device to the wireless computer network;
    providing a call disruption indicator to a first user associated with the mobile computing device in response to a connectivity loss between the mobile computing device and the wireless computer network;
    providing a call disruption indicator to a second user associated with the second computing device in response to the connectivity loss between the mobile computing device and the wireless computer network;
    determining geographical location information associated with the mobile computing device in response to the connectivity loss between the mobile computing device and the wireless computer network;
    establishing a connectivity loss model based upon the determined geographical location information;
    providing a connectivity loss warning indicator to the first user based upon a proximity metric of the geographical location information associated with the mobile computing device and the connectivity loss model; and
    providing the connectivity loss warning indicator to the second user based upon the proximity metric of the geographical location associated with the mobile computing device and the connectivity loss model.

2. The method of claim 1, wherein the wireless computer network comprises wireless access points supporting a wireless local area network.

3. The method of claim 1, wherein the voice call comprises a wireless voice-over-internet-protocol (VoIP) call.

4. The method of claim 1, wherein the second computing device comprises a second mobile computing device connected to the wireless computer network.

5. The method of claim 1, wherein the second computing device is a voice gateway and the user associated with the second computing device is communicating via a traditional landline telephone or a traditional mobile carrier telephone.

6. The method of claim 1, wherein the geographical location information comprises position information and motion information.

7. The method of claim 1, wherein the second computing device comprises a second mobile computing device and the voice call comprises a peer-to-peer connection between the mobile computing device and the second mobile computing device.

8. The method of claim 1, wherein the call disruption indicator comprises an audible voice announcement.

9. The method of claim 1, wherein the call disruption indicator comprises audible hold music.

10. The method of claim 1, wherein the voice call further comprises video conferencing.

11. A wireless call interruption mitigation system, comprising:
   one or more processing units, and one or more processing modules, wherein the wireless call interruption mitigation system is configured by the one or more processing modules to:
   establish a wireless connection between a mobile computing device and a wireless computer network;
   establish a voice call over the wireless computer network between the mobile computing device and a second computing device;
   monitor a connectivity status of the mobile computing device to the wireless computer network;
   provide a call disruption indicator to a first user associated with the mobile computing device in response to a connectivity loss between the mobile computing device and the wireless computer network;
   provide the call disruption indicator to a second user associated with the second computing device in response to the connectivity loss between the mobile computing device and the wireless computer network;
   determine geographical location information associated with the mobile computing device in response to the connectivity loss between the mobile computing device and the wireless computer network;
   establish a connectivity loss model based upon the determined geographical location information;
   provide a connectivity loss warning indicator to the first user based upon a proximity metric of the geographical location information associated with the mobile computing device and the connectivity loss model; and
   provide the connectivity loss warning indicator to the second user based upon the proximity metric of the geographical location associated with the mobile computing device and the connectivity loss model.

12. The wireless call interruption mitigation system of claim 11, wherein the wireless computer network comprises wireless access points supporting a wireless local area network.

13. The wireless call interruption mitigation system of claim 11, wherein the voice call comprises a wireless voice-over-internet-protocol (VoIP) call.

14. The wireless call interruption mitigation system of claim 11, wherein the second computing device comprises a second mobile computing device connected to the wireless computer network.

15. The wireless call interruption mitigation system of claim 11, wherein the second computing device comprises a voice gateway and the user associated with the second computing device is communicating via a traditional landline telephone or a traditional mobile carrier telephone.

16. The wireless call interruption mitigation system of claim 11, wherein the call disruption indicator comprises an audible voice announcement.

17. The wireless call interruption mitigation system of claim 11, wherein the call disruption indicator comprises audible hold music.

18. The wireless call interruption mitigation system of claim 11, wherein the geographical location information comprises position information and motion information.

19. The wireless call interruption mitigation system of claim 11, wherein the voice call further comprises video conferencing.

20. A computer program product, comprising:
   a non-transitory computer-readable storage medium having computer-readable program code embodied therein that, when executed by one or more computing devices, perform a method comprising:
   establishing a wireless network connection between a mobile computing device and a wireless local area computer network;
   establishing a voice call over the wireless local area computer network between the a first user associated with the mobile computing device and a second user, wherein the voice call leverages a voice gateway for connecting to a traditional landline telephone or a traditional mobile carrier telephone associated with the second user;
   monitoring a connectivity status of the mobile computing device to the wireless local area computer network;
   determining geographical location information associated with the mobile computing device in response to a connectivity loss between the mobile computing device and the wireless local area computer network;
   providing a connectivity loss warning indicator to the first user in response to a proximity metric of the geographical location information associated with the mobile computing device and a model of the connectivity loss between the mobile computing device and the wireless computer network; and
   providing the connectivity loss warning indicator to the second user in response to the proximity metric of the geographical location information associated with the mobile computing device and the model of the connectivity loss between the mobile computing device and the wireless computer network.

* * * * *